United States Patent
Maeda et al.

(10) Patent No.: US 7,555,483 B2
(45) Date of Patent: Jun. 30, 2009

(54) FILE MANAGEMENT METHOD AND INFORMATION PROCESSING DEVICE

(75) Inventors: Takuji Maeda, Neyagawa (JP); Hirokazu So, Moriguchi (JP); Makoto Ochi, Hirakata (JP); Masato Suto, Neyagawa (JP); Shinji Inoue, Neyagawa (JP)

(73) Assignee: Panasonic Corporation, Kadoma (JP)

( * ) Notice: Subject to any disclaimer, the term of this patent is extended or adjusted under 35 U.S.C. 154(b) by 431 days.

(21) Appl. No.: 10/533,819

(22) PCT Filed: Jul. 13, 2004

(86) PCT No.: PCT/JP2004/010283

§ 371 (c)(1),
(2), (4) Date: May 3, 2005

(87) PCT Pub. No.: WO2005/010757

PCT Pub. Date: Feb. 3, 2005

(65) Prior Publication Data
US 2008/0172397 A1 Jul. 17, 2008

(30) Foreign Application Priority Data
Jul. 24, 2003 (JP) ............................. 2003-278961

(51) Int. Cl.
*G06F 7/00* (2006.01)
*G06F 17/30* (2006.01)

(52) U.S. Cl. ............................................ 707/10; 707/2
(58) Field of Classification Search .................... 707/10
See application file for complete search history.

(56) References Cited

U.S. PATENT DOCUMENTS

| | | | | |
|---|---|---|---|---|
| 5,371,885 A * | 12/1994 | Letwin | ........................ | 707/205 |
| 7,181,473 B1 * | 2/2007 | Lacouture et al. | ........... | 707/202 |
| 7,272,613 B2 * | 9/2007 | Sim et al. | .................... | 707/102 |
| 2004/0122867 A1 * | 6/2004 | Drews | ........................ | 707/200 |

(Continued)

FOREIGN PATENT DOCUMENTS

JP     5-158771 A     6/1993

(Continued)

OTHER PUBLICATIONS

"Information Technology-Volume and File Structure of Disk Cartridges for Information Interchange", Nov. 1994, pp. 1-40, second edition, ISO/IEC 9293, ISO/IEC, Switzerland.

*Primary Examiner*—John E Breene
*Assistant Examiner*—Joshua Bullock
(74) *Attorney, Agent, or Firm*—Smith Patent Office

(57) ABSTRACT

An information processing device that reads out and records data from and on an information recording medium includes a file system controller. File system control information is constructed in a system memory within the information processing device, and the file system controller unifies and controls a plurality of information recording media which are managed by individual file systems into a single virtual file system. In addition, the file system controller manages a priority order that indicates an information recording medium to be utilized with priority if files having the same name exist. This priority order can be changed in response to a request from an application program. Thus, the processor can unify and manage the plurality of information recording media and, also, enables the application to access all of the files having the same name.

14 Claims, 14 Drawing Sheets

U.S. PATENT DOCUMENTS

| | | | |
|---|---|---|---|
| 2004/0230599 A1* | 11/2004 | Moore et al. | 707/102 |
| 2005/0024513 A1* | 2/2005 | Hayashi et al. | 348/333.01 |
| 2006/0036568 A1* | 2/2006 | Moore et al. | 707/1 |

FOREIGN PATENT DOCUMENTS

| | | | |
|---|---|---|---|
| JP | 5-298030 A | 11/1993 | |
| JP | 10-333963 A | 12/1998 | |
| JP | 2000-163298 A | 6/2000 | |
| JP | 2002-244901 A | 8/2002 | |

* cited by examiner

FILE MANAGEMENT METHOD AND INFORMATION PROCESSING DEVICE

TECHNICAL FIELD

The present invention relates to a file management method for unifying and managing a plurality of information recording media which are individually managed by a file system, and an information processing device using this file management method.

BACKGROUND ART

Information recording media include semiconductor memory, magnetic disks, optical disks, magnetooptical disks and the like. Data stored in an information recording region of such information recording media is conventionally managed by a file system. According to a file system, an information recording region is divided into sectors, which are the minimum access units, and clusters, which are an aggregate of sectors, so as to be managed in such a manner that one or more clusters are managed as files.

A FAT file system is cited as an example of a file system which is conventionally utilized. The detail thereof is disclosed in ISO/IEC9293, "Information Technology-Volume and file structure of disk cartridges for information", 1994.

The FAT file system is a file system which is generally used in an information apparatus such as a personal computer, where physical storage positions of data that forms a file are managed in a unified manner by a table which is referred to as FAT (File Allocation Table). Information recording media of which the data is managed by the FAT file system can share files between apparatuses that can interpret the same file system. As a result of this, it becomes possible to transmit and receive data between a plurality of apparatuses by using the FAT file system.

Such a file system is usually constructed for the purpose of managing one information recording medium. When a plurality of information recording media exist in an information processing device, the individual information recording media are managed by file systems which are independent of each other. There is a conventional management method by means of a drive and a conventional management method by means of a mount point as methods according to which an information processing device handles a plurality of information recording media.

According to the management method by the drive, the device allocates drive IDs (such as C drive and D drive) particular to the respective information recording media so as to switch the information recording medium to be accessed by using these drive IDs. In addition, according to the management method by the mount point, a tree structure of each information recording medium is allocated to a specific portion within a tree structure that is formed of files and directories managed by a main file system. Then, an access position within the tree structure is switched, so that the information recording medium to be accessed is switched.

However, it is necessary for the user to utilize a plurality of information recording media which are switched according to these methods; therefore, the user's task becomes greater as the number of information recording media increases. In addition, when a plurality of information recording media can be freely attached to or detached from an information processing device, they are allocated to a drive or an access position that is different from the one to which they were allocated at the time when they were previously attached, if the order or the positions of the media attached to the information processing device are different. In this case, it becomes difficult for the user to correctly specify an information recording medium.

As a method for solving such a problem, a method for using a unified file system where a plurality of information recording media are unified so as to integrate the interfaces with applications into one has conventionally been proposed. This method is disclosed, for example, in JP-A 2000-163298. According to this conventional method, a plurality of information recording media are managed by individual file systems. Thus, the unified file system for unifying the respective file systems is provided in a layer above these, so as to integrate the interfaces with applications into one. In this manner, the file systems are divided into two layers so that they are manageable; thus, the interfaces with applications are unified, reducing the task of the user.

However, the above-described conventional art has the following problem. An object of the conventional file management method is to facilitate an increase in recording capacity in an information processing device by adding an information recording medium where an arbitrary file system has been constructed to the information processing device. Therefore, it is not assumed that a plurality of information recording media are utilized in a such manner that they are freely attached to or detached from a plurality of information processing devices. In addition, a case is not assumed where files having the same name exist within a plurality of information recording media. When files having the same name exist, an application cannot determine which file has been accessed, due to the unified interface. In the worst case scenario, therefore, all the files having the same name will become inaccessible.

The present invention has been made in view of the above-described problem, and an object thereof is to make an application think that the entirety of a plurality of information recording media is virtually managed by a single file system when individual file systems are constructed for the plurality of information recording media, and to implement a method for an application to access the respective files, even when files having the same name exist.

DISCLOSURE OF THE INVENTION

An information processing device according to the present invention is characterized in that a plurality of information recording media can be simultaneously attached when the plurality of information recording media exist and data stored in an information recording region can be managed as a file by an individual file system. A system memory retains file system control information which recognizes individual file systems constructed in the plurality of information recording media and which are unified into a single virtual file system to be controlled. A file system controller manages a priority order concerning utilization of the plurality of information recording media and, also, refers to slot information and open information included in file system control information in response to a request from a program of an application, so as to access a file in a logical information recording region of the information recording medium.

A file management method according to the present invention is characterized in that data that has been stored respectively in information recording regions within a plurality of information recording media is managed by a file system controller and an access controller in an information processing device. First, a utilization priority order is set for a plurality of slots through which information recording media are attached. Then, when an information recording medium is attached to any of the plurality of slots, slot information is processed in reference to data in the management information region that has been recorded in the information recording medium and data in a part of the data region, so as to produce a part of file system control information. When a specific file is opened from the information recording medium, the file system controller refers to the slot information included in the file system control information and the priority order included in the file system control information, accesses all of the information recording media attached to the slots, and confirms whether or not the file designated by the application exists. If the designated file exists, open information is prepared and a flag indicating whether or not files having the same name exist is registered with the file information. As a result of this, the file system controller produces the rest of the file system control information and the unified file system, which unifies the individual file systems in the plurality of information recording media. When data of a specific file is read out from an information recording medium, the file system controller refers to the open information of the file system control information by using a file handle acquired when a file of the application is opened, and determines the slot information to be utilized. Then, the obtained slot number is given to an access controller, so that file data required for the application is read out from a specific information recording medium. Meanwhile, when file data is recorded on an information recording medium, the file system controller refers to file system control information by using the file handle acquired when a file of the application is opened, and determines slot information to be utilized. Then, the obtained slot number is given to the access controller, so that the file data created by the application is recorded on a specific information recording medium and, also, the slot information in the file system control information is updated.

BEST MODE FOR CARRYING OUT THE INVENTION

Figure 1:
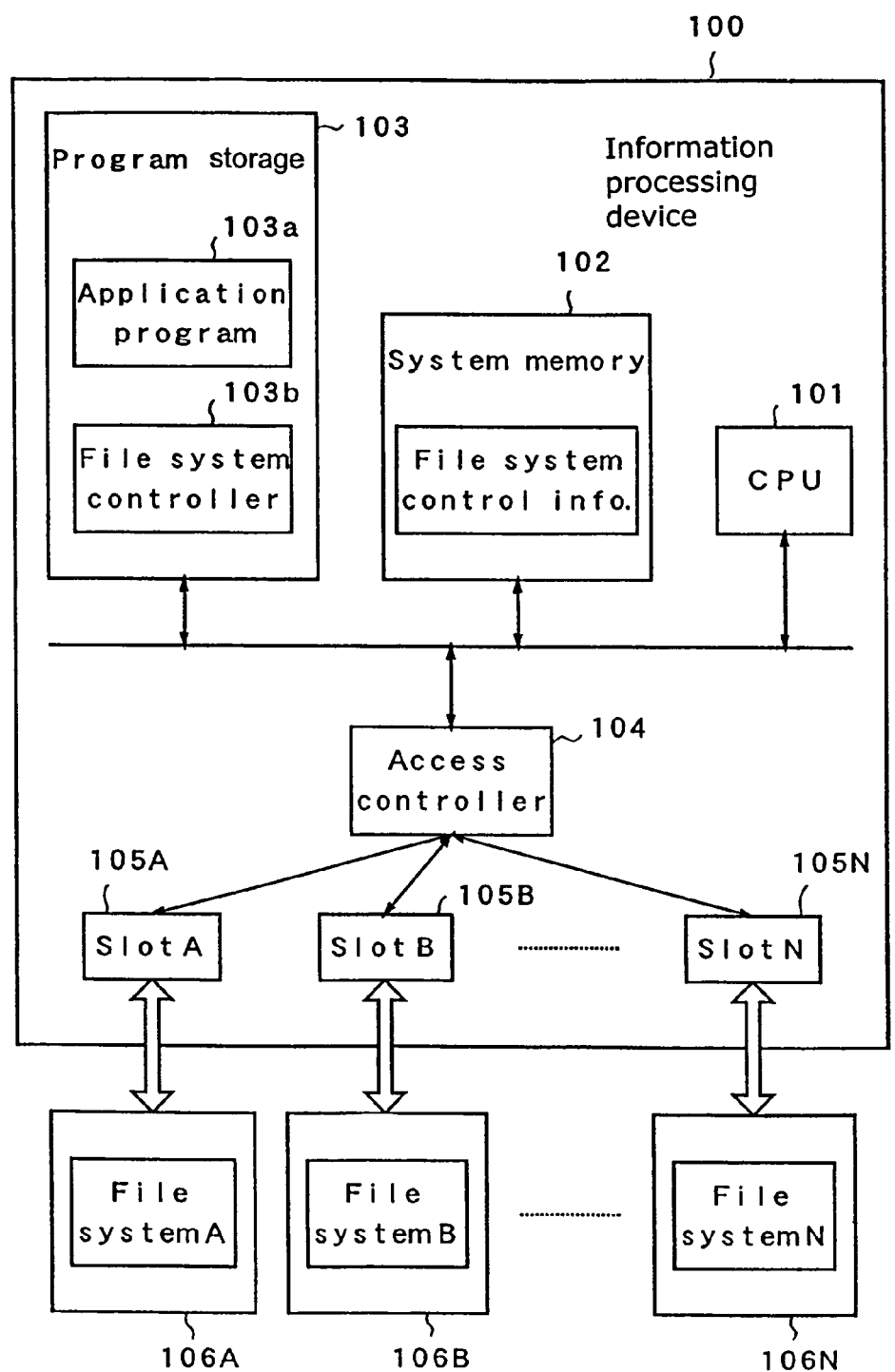
FIG. 1 is a diagram showing a configuration of an information processing device and information recording media according to an embodiment of the present invention.

In the following, a file management method according to the present invention is described with reference to the drawings. FIG. 1 is a diagram showing a configuration of an information processing device and information recording media where a file management method according to an embodiment of the present invention is used. In FIG. 1, an information processing device 100 includes a CPU 101, a system memory 102, a program storage 103, an access controller 104 and slots 105A to 105N.

The system memory 102 is a memory utilized by a program which runs on the information processing device. The program storage 103 is a part for storing an application program and the like that run on the information processing device. The access controller 104 controls access to information recording media 106. The information processing device 100 of this embodiment is provided with the slots 105A, 105B, . . . and 105N, to which a plurality of information recording media 106A, 106B, . . . and 106N are attached, and can access data stored in these information recording media.

In addition, the program storage 103 includes an application program 103a (hereinafter, referred to as application) and a file system controller 103b which interprets a file system constructed within the information recording media 106 and which manages data.

Figure 2:
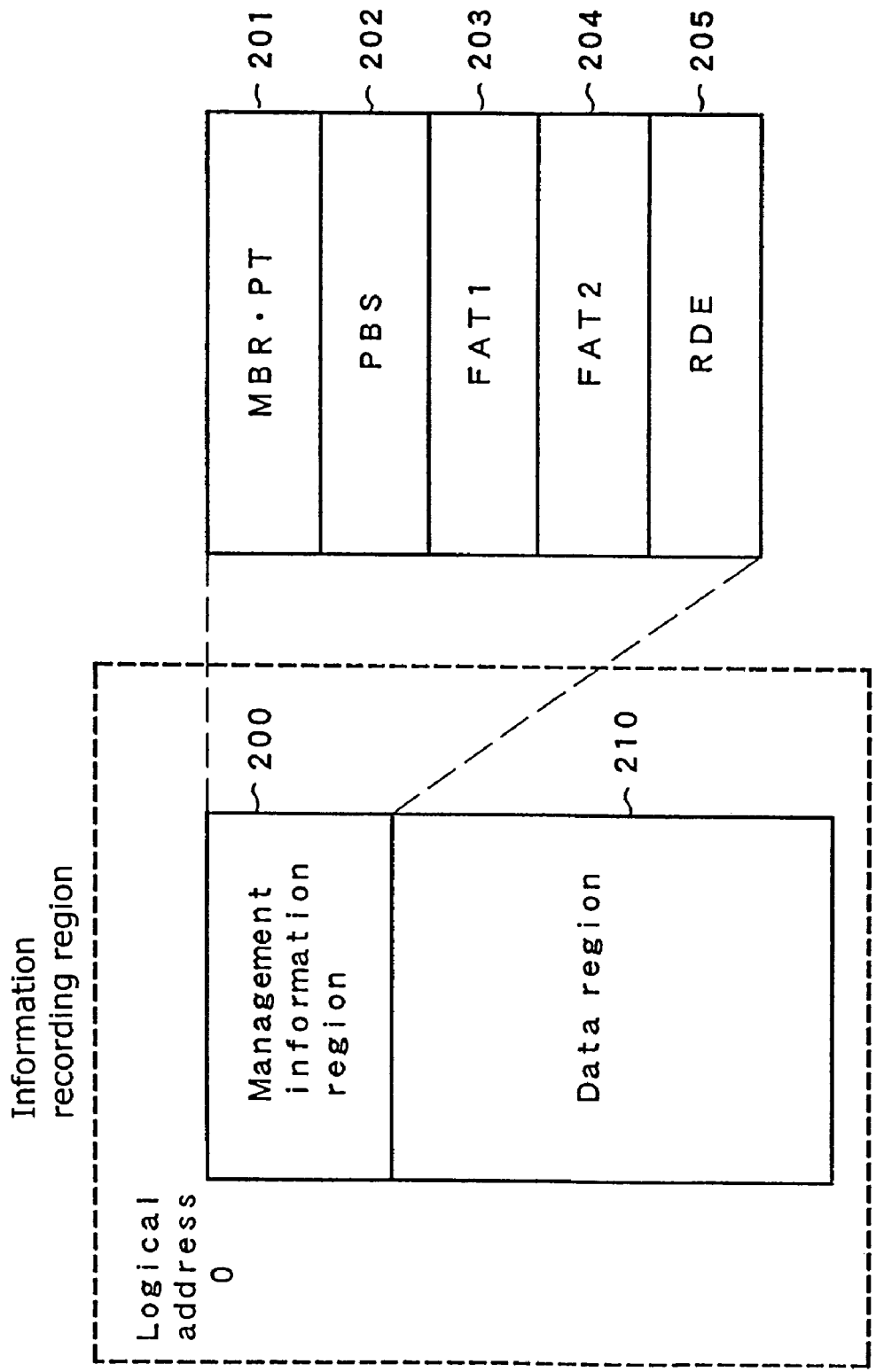
FIG. 2 is a diagram showing a configuration of a FAT file system.

Subsequently, a FAT file system is described as an example of a file system stored in an information recording region of the information recording media 106A, 106B, . . . , and 106N. FIG. 2 is a conceptual diagram showing a configuration of the FAT file system. In the FAT file system, a management information region 200 for managing information recording regions exists in the lead of the information recording region, and behind this, a data region 210 for storing data or the like within a file exists. The management information region 200 is formed of a master boot record and partition table (MBR·PT) 201, a partition boot sector (PBS) 202, a FAT 203, a FAT 204 and a root directory entry (RDE) 205.

The master boot record partition table 201 is a part which stores information for dividing the information recording region into a plurality of regions, referred to as partitions, which are managed. The partition boot sector 202 is a part for storing management information within one partition. The FATs 203 and 204 are parts for indicating physical storage positions of data included in files. The root directory entry 205 is a part for storing information on the file and the directory that exist directly beneath the root directory. In addition, FATs are important regions which indicate physical storage positions of data included in files; therefore, two FATs 203 and 204 having the same information usually exist within an information recording medium for duplicating information.

The data region 210 is divided into a plurality of clusters so as to be managed, and file data is stored in each cluster. A large amount of data stored in one file is stored in a plurality of clusters where the connection among these clusters is managed by link information stored in the FATs 203 and 204.

Figure 3A:
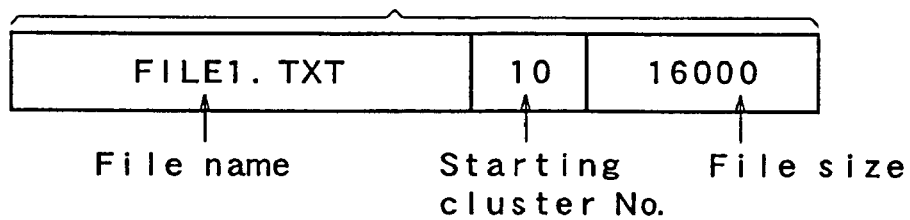
FIGS. 3A-3C illustrate diagrams showing an example where file data is read in the FAT file system.

With reference to FIG. 3, an example is described where file data is read in the FAT file system. A directory entry 301 for storing a file name, a file size and the like, as shown in FIG. 3(A), is provided in the root directory entry 205 and in a part of the data region 210. The data region 210 which stores file data is managed in cluster units, and uniquely recognizable cluster numbers are given to the respective clusters. In order to specify the cluster where file data is stored, the number of the cluster where the leading portion of the file data is stored, namely, the starting cluster number is recorded on the directory entry 301. The example of the directory entry 301 of FIG. 3(A) indicates that data of a file having the name, FILE1.TXT, is stored in clusters starting from cluster number 10.

Figure 3B:
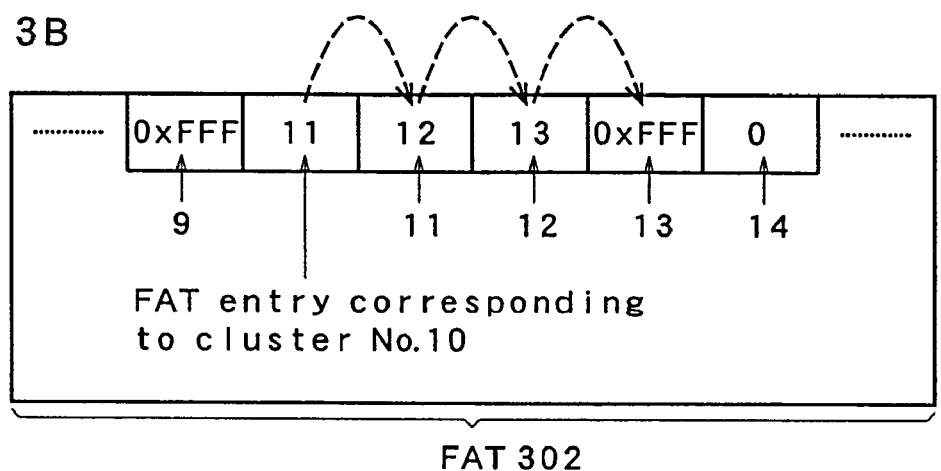

In a case of a file where data is stored in a plurality of clusters, it is necessary to specify cluster numbers that follow the starting cluster number, so that the clusters that store the data can be traced. Link information for the clusters that is required therefor is stored in the FATs. FIG. 3(B) shows an example of the FAT 302 that stores the link information. The FAT 302 is provided with fields which correspond to the respective cluster numbers, and the respective fields are provided with FAT entries which indicate link information of the respective clusters. The cluster numbers of clusters linked to a following cluster are stored in FAT entries. In the example of FIG. 3(B), "11" is stored as a FAT entry that corresponds to cluster number 10; therefore, the cluster of cluster number 10 is linked to the cluster of cluster number 11. In the same manner, "12" is stored in the FAT entry that corresponds to cluster number 11, and "13" is stored in the FAT entry that-corresponds to cluster number 12, indicating that the clusters are linked in the order of cluster numbers 10, 11, 12 and 13. Next, "0xFFF" is stored in the FAT entry that corresponds to cluster number 13, where "0xFFF" indicates the terminal of the link. Therefore, the link which starts with cluster number 10 ends after the four clusters 10, 11, 12 and 13. In addition, "0" stored in the FAT entry that corresponds to cluster number 14 indicates that this cluster is not allocated to a file and, thus, becomes an empty region.

Figure 3C:
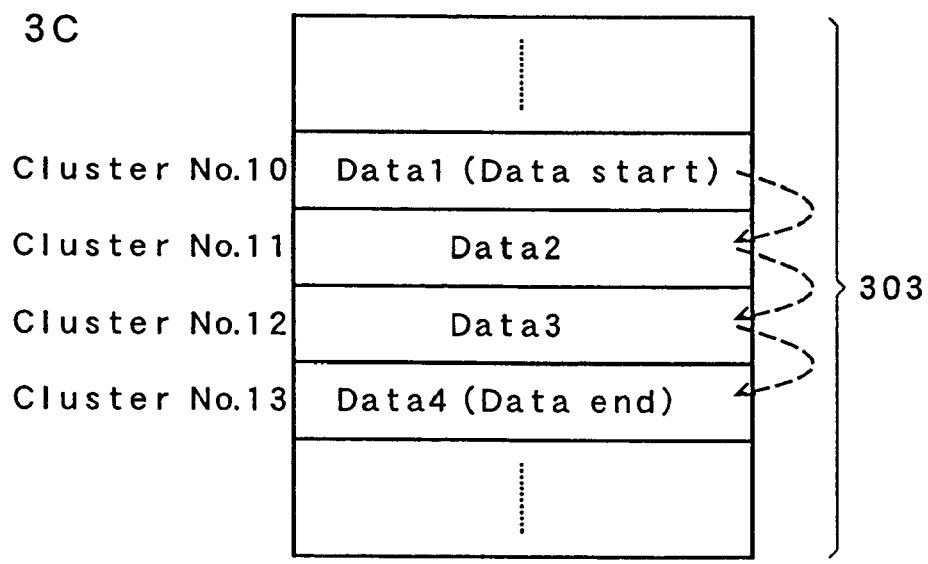

As seen from FIGS. 3(A) and 3(B), it is recognized that the data regions allocated for the file FILE1.TXT are cluster numbers 10, 11, 12 and 13. If the data of the file FILE1.TXT is actually read in, as shown in FIG. 3(C), the data of cluster numbers 10, 11, 12 and 13 in the data region 303 is subsequently read in.

As described above, in order to access a file managed by the FAT file system, it is necessary to recognize the structure of the management information region 200, to search for the root directory entry 205 and the directory entry stored in the data region 210, and to acquire the directory entry 301 which stores information on a desired file. In addition, it is necessary to acquire link information between the clusters in the data region by means of the FAT, and to grasp the positions of the clusters in the data region which stores the data within the file. Therefore, after the information recording medium 106 has been attached to the information processing device 100, the information processing device 100 reads out information in the management information region 200 so as to retain the information required for file access in the memory.

Figure 4:
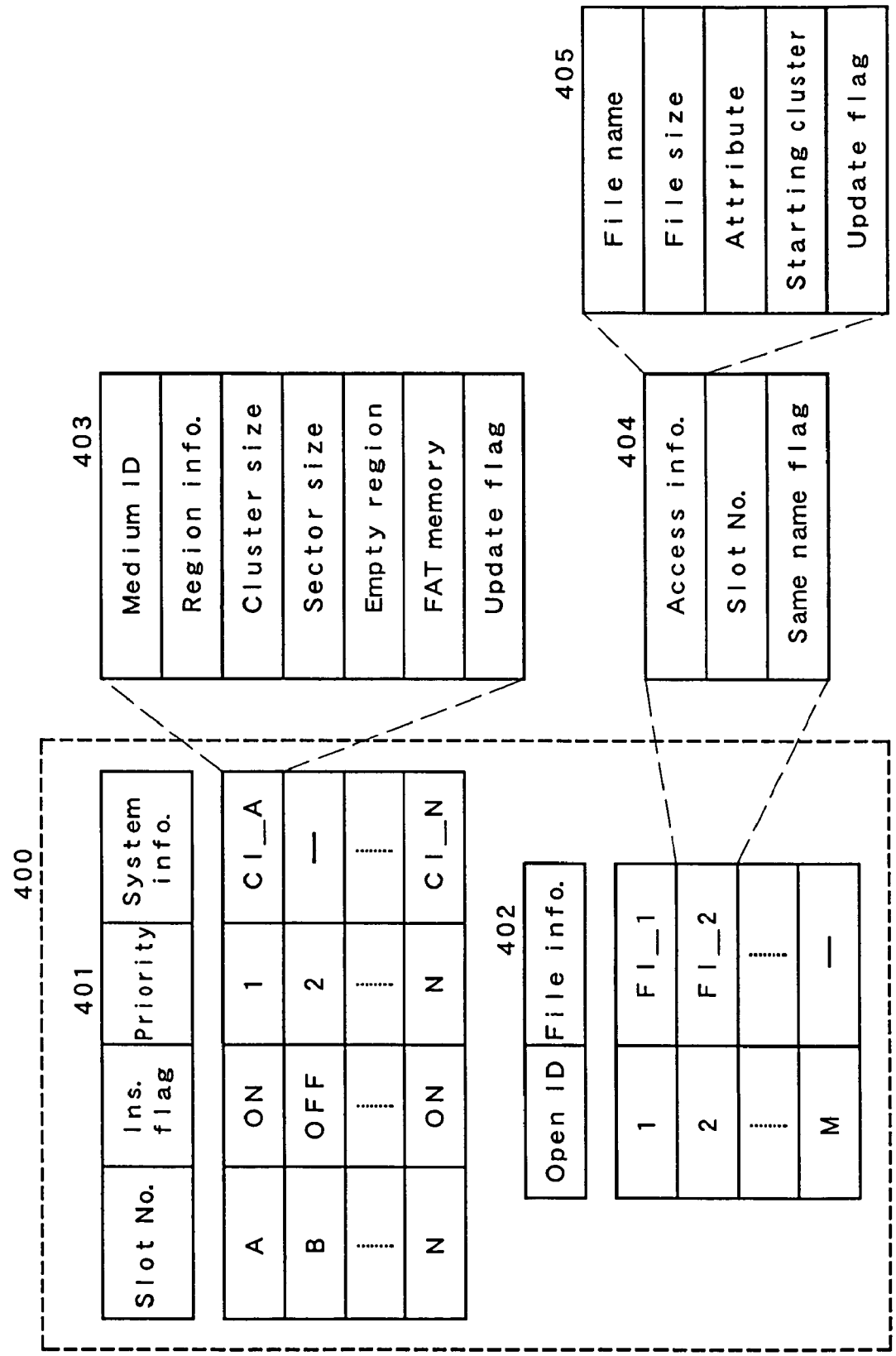
FIG. 4 is a diagram showing a configuration of file system control information according to the embodiment of the present invention.

Next, file system control information in this embodiment is described. FIG. 4 is a diagram showing a configuration of file system control information in this embodiment. File system control information 400 is formed of slot information 401 and open information 402. The slot information 401 is information for controlling individual file systems constructed within the plurality of information recording media 106. The open information 402 is information on an opened file.

The slot information 401 includes slot numbers, insertion flags, priority order and system information. The insertion flag is a flag indicating whether or not an information recording medium is inserted into each slot. The priority order indicates a priority for use of the slots. The system information is information on file systems constructed within the inserted information recording media. Sets of information of which the number is the same as that of the slots that exist within the information processing device are retained, where one set of information consists of the above-described four pieces of information. System information 403 is information required for accessing a file system constructed within one information recording medium. The system information 403 is formed of medium ID, region information, cluster size, sector size, empty region length, FAT memory, update flag and the like.

The medium ID is an ID utilized to identify the medium. The region information is a region including information on placement address and size of management information, such as a partition boot sector and FATs. The cluster size and the sector size are sizes utilized by the file system as the units of data management. The empty region length is information indicating the total length of the present empty regions in the data region. The FAT memory is a memory utilized for caching in the FAT memory. The update flag is a flag indicating whether or not the FAT memory is updated.

The file system controller 103b of FIG. 1 accesses a file within an information recording medium 105 on the basis of the system information 403. The slot information 401 includes pieces of system information 403 of which the number is the same as that of the slots existing in the information processing device 100. The file system controller 103b switches the system information 403 to be utilized in accordance with the slot number upon accessing each information recording medium 105.

The open information 402 retains pieces of file information 404, which is information concerning the opened files, of which the number is the same as that of the files that have been opened. File information 404 is formed of access information, slot numbers and flags for files having the same name. Access information 405 is information required for accessing a file. The slot numbers are numbers indicating the information recording media which store files. The flags for files having the same name are flags indicating whether or not a file having the same file name exists in another information recording medium.

Furthermore, the access information 405 is formed of a file name, file size, attribute of file, starting cluster number, update flag and the like. The starting cluster number is the number indicating the starting position of region where data of a file is stored. Update flag is flag indicating whether or not a file is updated. The file system controller 103b of FIG. 1 accesses a file that has been opened on the basis of these pieces of information.

This embodiment has a first feature in that it is not necessary for an application to individually recognize the plurality of pieces of system information 403 that exist in the slot information 401, and a plurality of information recording media can be handled as if they are managed by a single piece of system information. For example, the system information 403 holds empty region lengths of the individual information recording media 105, and the application allows the file system controller 103b to acquire the value obtained by summing these empty region lengths as the empty region length of an information recording medium. As described above, the file system controller 103b unifies the plurality of information recording media 106A to 106N by using the file system control information 400, and can make the application think that a single information recording medium 106 is virtually attached.

This embodiment also has a second feature in that the slot numbers which indicate the information recording media 105 where files have been stored and the flags for files having the same name that indicate the existence of a same file name exist in the file information 404 included in the open information 402. In this embodiment, if files having the same file name exist in a plurality of information recording media, one file is selected for use in accordance with the priority order stored in the slot information 401. In addition, the priority order of the respective slots can be arbitrarily set according to the application, and the application can utilize any desired file.

Next, the following processes for the information processing device 100 of this embodiment are sequentially described:
(1) a process when power is turned on,
(2) a process upon attaching an information recording medium,
(3) a file access process, and
(4) a process of changing a priority order.

Figure 5:
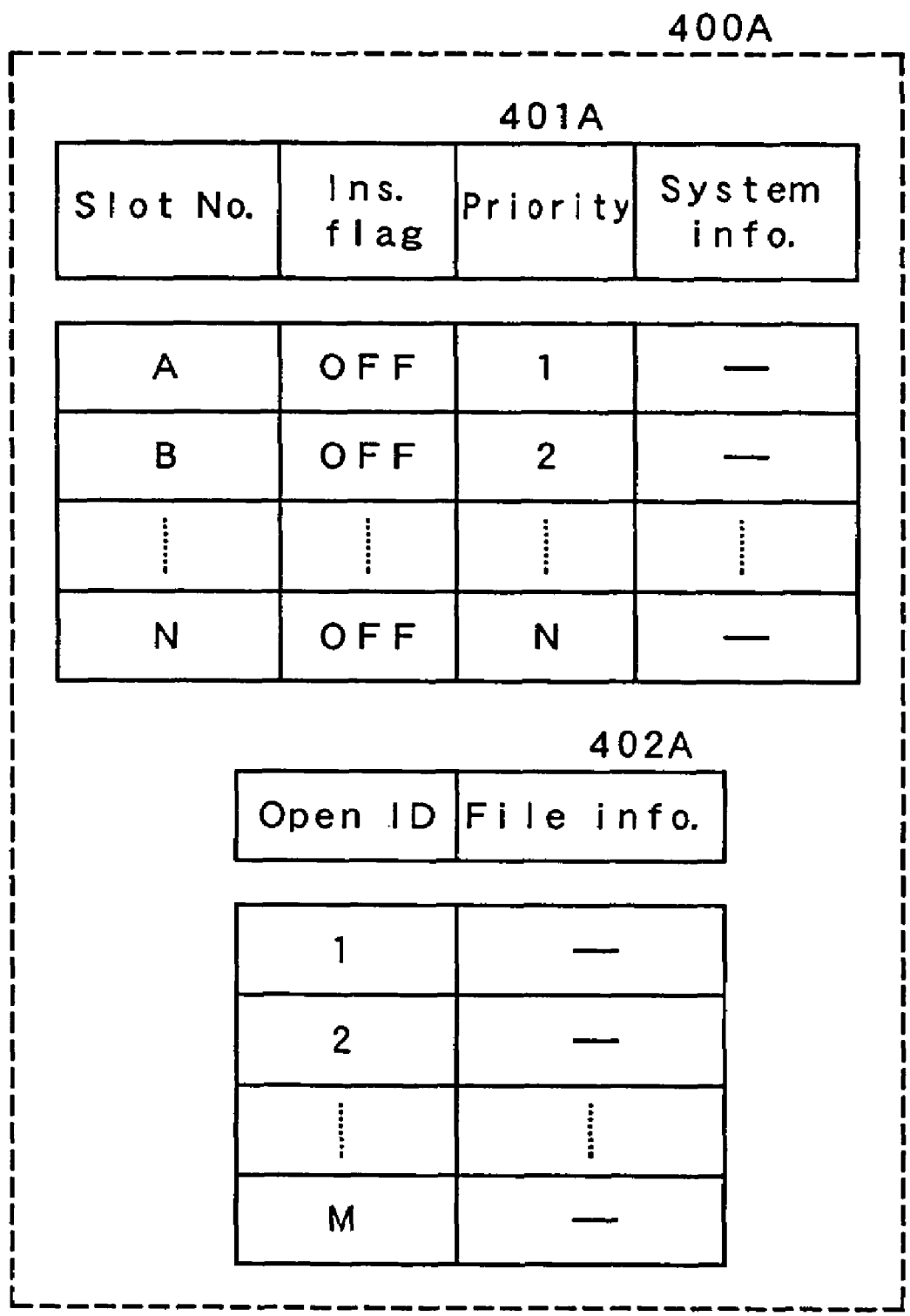
FIG. 5 is a diagram showing an example of file system control information after a process of turning on the information processing device.

(1): The process upon turning on the information processing device 100 is described with reference to FIG. 5. When the information processing device 100 is turned on, the file system controller 103b initializes file system control information 400 which exists in the system memory 102 so as to convert it to file system control information 400A in the state shown in FIG. 5. In slot information 401A, the insertion flags are set to OFF for all of the slots. In this case, the system information 403 is in a state of no storage. In addition, the entirety of open information 402A also becomes of the state of no storage, that is, no file is open. Namely, the initial state of the file system control information 400 upon turning on the information processing device 100 is set to a state where no information recording medium 106 is attached and no file is open. Accordingly, the file system controller 103b becomes of the state of standby for attachment of the information recording medium 106. In addition, the priority order that indicates the use priority of the respective slots is set at the initial value allocated in advance for each slot, as shown in FIG. 5.

Figure 6A:
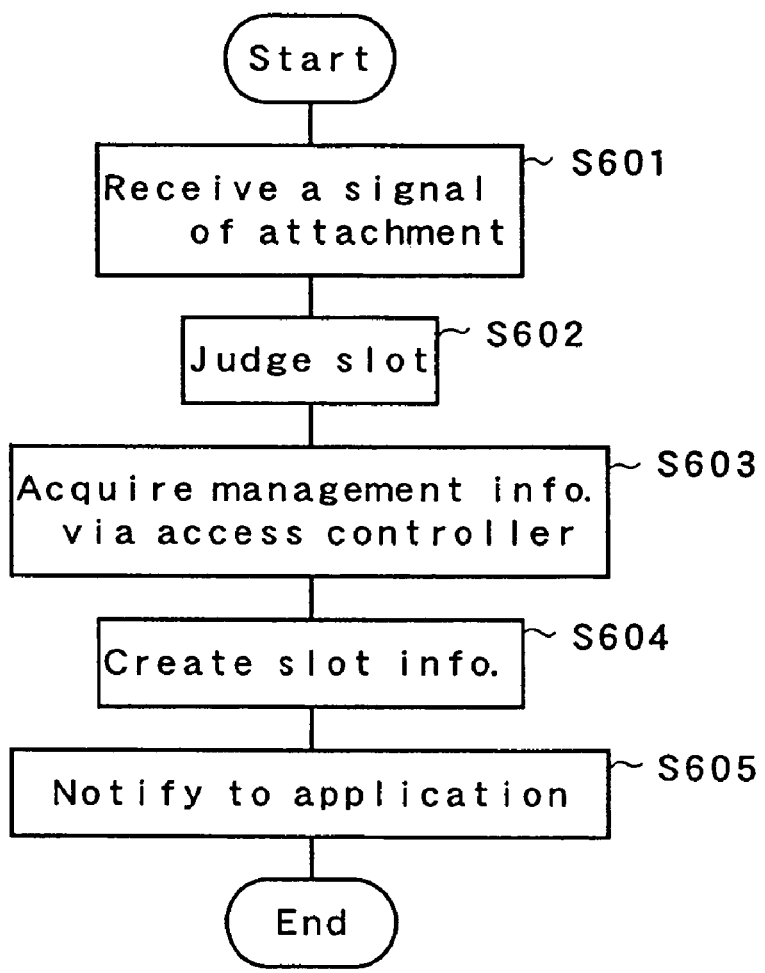
FIGS. 6A-6B show a flowchart and process of attaching an information recording medium.
Figure 6B:
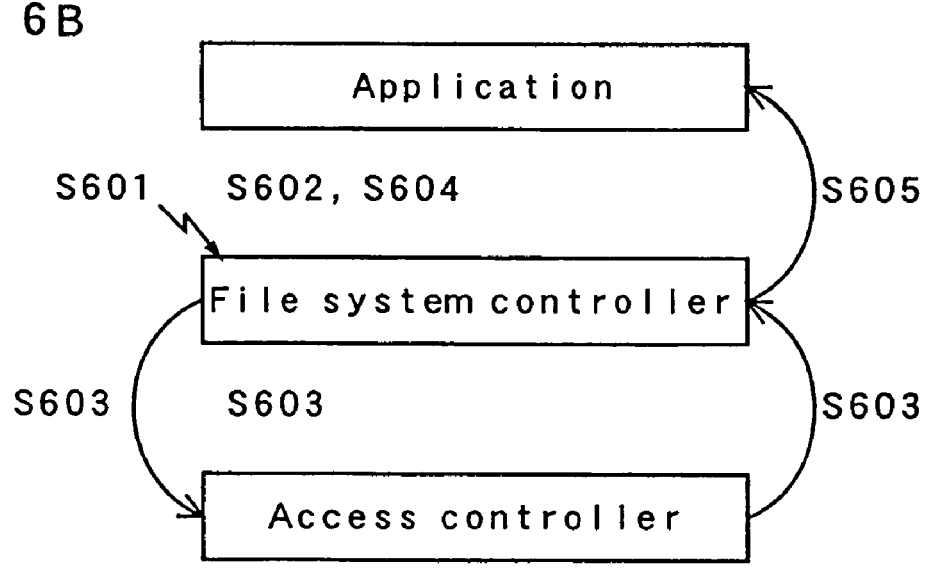
Figure 7:
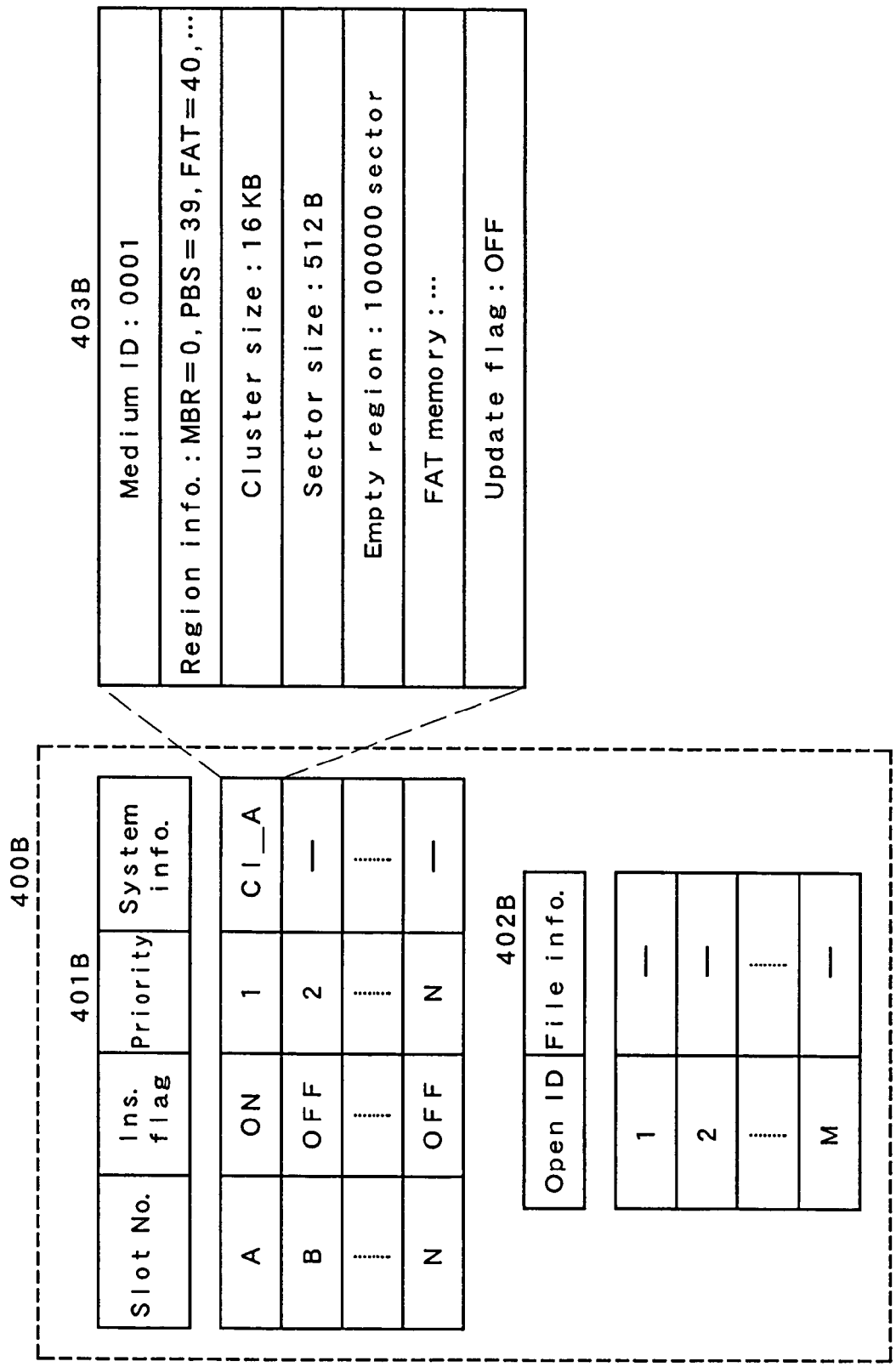
FIG. 7 is a diagram showing an example of file system control information after a process of attaching the information recording medium.

(2): The process upon attaching the information recording medium 106 is described with reference to FIGS. 6 and 7. When the information recording medium 106 is attached to the information processing device 100, the file system controller 103b creates slot information 401B, as shown in FIG. 7, and prepares to access the information recording medium 106. The procedure is described with reference to FIG. 6, which shows a processing method upon attaching the information recording medium 106. FIG. 6(A) is a flowchart showing a procedure in the attachment. FIG. 6(B) is a diagram showing the relationship between the application 103a, the file system controller 103b and the access controller 104.

In the process upon attaching the information recording medium 106, first, a signal indicating that the information recording medium 106 has been attached is transmitted to the file system controller 103b (S601). Upon reception of the signal of the attachment of the information recording medium 106, the file system controller 103b interprets the received signal so as to determine to which slot the information recording medium 106 has been attached (S602). Next, the slot number determined in S602 is given to the access controller 104 so that the access controller 104 reads in management information of the file system from the attached information recording medium 106 (S603). This management information is recorded on the management information region 200 of FIG. 2.

When the access controller 104 receives a read-in request from the file system controller 103b, the access controller 104 carries out an actual read-in operation of data. At this time, the access controller 104 receives information on the slot number, the read-in starting position and the size of the read-in from the file system controller 103b, and reads in data on the designated position and the designated size from the information recording medium 106 attached to the designated slot. Then, the access controller 104 returns the read-in result and data to the file system controller 103b. In addition, the management information of the file system is information which is necessary for creating slot information 401B, and is a master boot record and partition table, a partition boot sector and FATS, as shown in FIG. 2, in the case of a FAT file system.

Next, the slot information 401B is created on the basis of the acquired management information of the file system (S604). As a result of the process upon attaching the information recording medium 106, the file system control information 400B becomes of the state shown in FIG. 7. In the example of FIG. 7, a case is assumed where the information recording medium 106A is attached to the slot A and the insertion flag of the slot information for the slot A is set to ON, indicating that the information recording medium 106A is attached to the slot A. In addition, system information CI_A (system information 403B), as shown on the right side in FIG. 7, is created as the system information 403B of the slot A on the basis of the management information of the file system that has been read in S603.

Finally, the application 103a is notified that the memory capacity has increased, and the process is completed (S605). The application 103a recognizes a plurality of information recording media as a single virtual information recording medium; therefore, it recognizes that the memory capacity of the virtual information recording medium has increased due to the process of S605 in the case an information recording medium is newly attached.

(3-1): A file open process is described as the file access process with reference to FIGS. 8 and 9. When a request for opening a file is issued to the file system controller 103b from the application 103a, the file system controller 103b uses the slot information 400 so as to access all of the information recording media 106 in order to confirm whether or not a file designated by the application exists. If the file exists, open information 402 is created, and if a plurality of files having the same name exist, the application is notified that files having the same name exist.

Figure 8A:
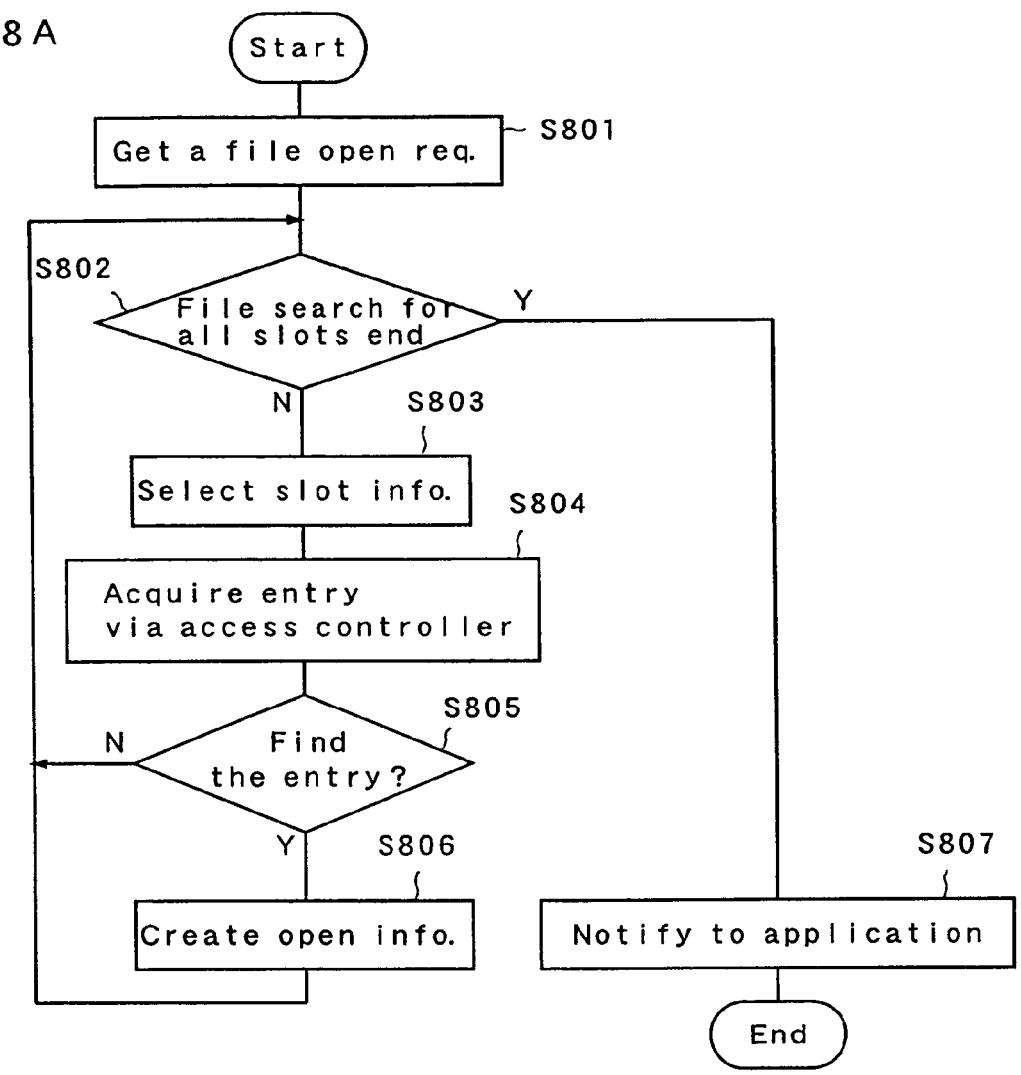
FIGS. 8A-8B show a flowchart and process for a file opening process.
Figure 8B:
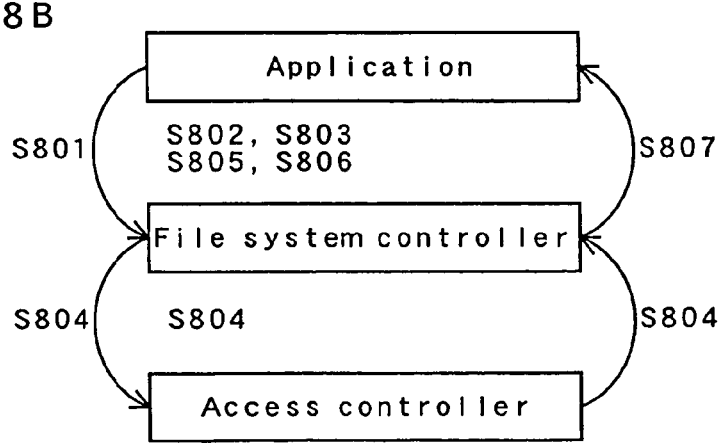
Figure 9:
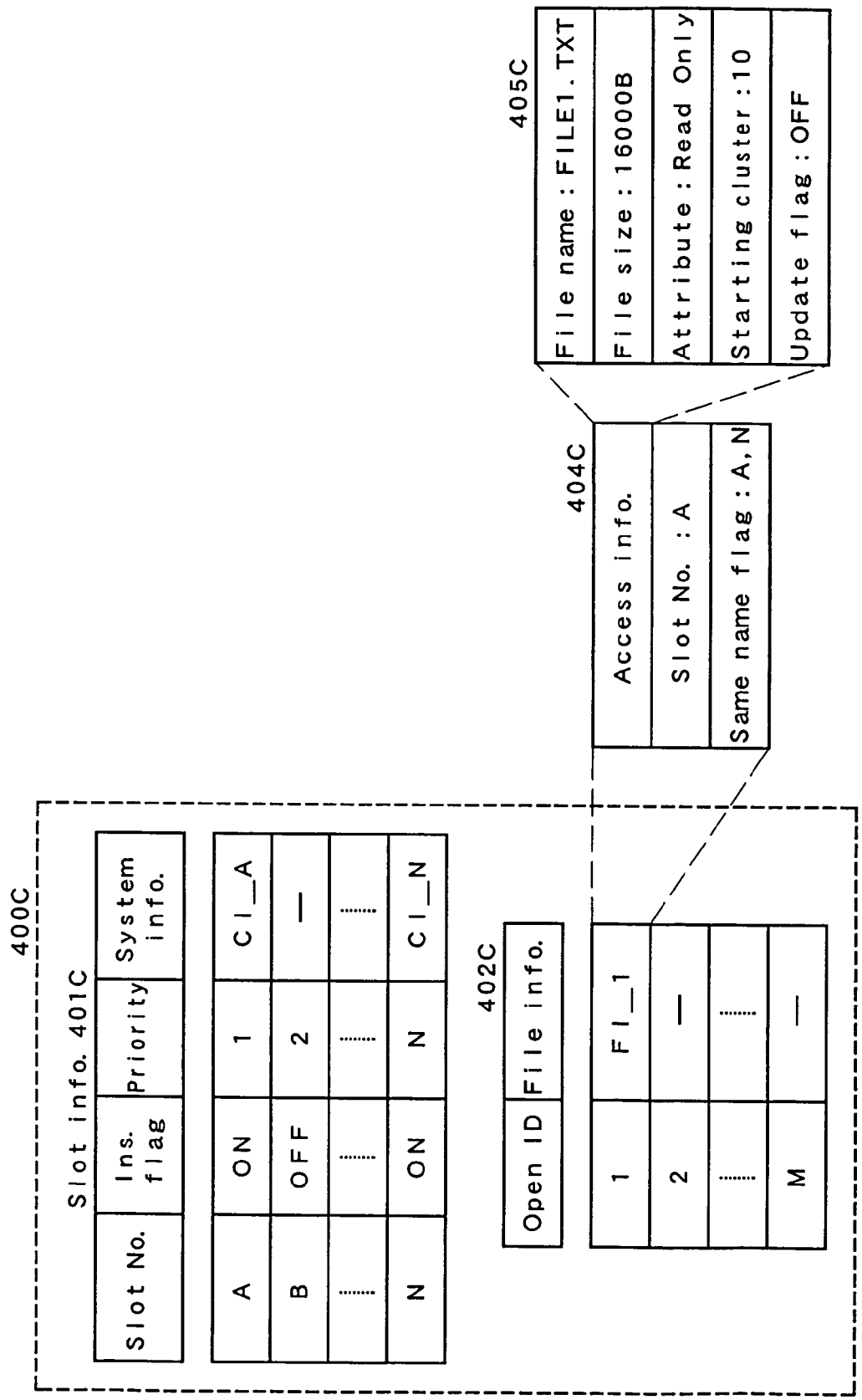
FIG. 9 is a diagram showing an example of the file system control information after the file opening process.

A procedure for opening a file is concretely described with reference to FIG. 8. FIG. 8(A) is a flowchart showing the procedure for opening a file, and FIG. 8(B) is a conceptual diagram showing the relationship between the application 103a, the file system controller 103b and the access controller 104. In addition, FIG. 9 is a diagram showing file system control information 400C in the file open process. In the file open process, first, a request for opening a file is issued from the application 103a to the file system controller 103b (S801). In the request for opening a file, the application 103a designates only the file name to the file system controller 103b, and does not designate the slot number. Namely, the application 103a accesses a file stored in an information recording medium 106 using only the file name, without recognizing the slot number.

Upon reception of the request for opening a file, the file system controller 103b refers to the slot information 401C shown in FIG. 9, and determines whether or not the file search process has been completed for all of the slots to which the information recording media 106 is attached (S802). If no information recording medium 106 is attached to the information processing device 100, or if the file search process is complete for all of the slots, the procedure proceeds to S807, and the application 103a is notified that the search process has been completed. If the search is incomplete in S802, the file system controller 103b selects the slot having the highest priority from among the slots where the search is still incomplete in accordance with the priority order of the slot information 401C (S803).

Next, the file system controller 103b designates the number of the slot selected in S803 to the access controller 104, and reads in the directory entry (hereinafter, referred to as entry) which stores information of the file and the directory from the attached information recording medium 106 (S804). At this time, the file system controller 103b calculates information on the read-in starting position and the read-in size, which are required for read-in from the information recording medium 106 on the basis of the slot information 401C that corresponds to the selected slot, and the information is given to the access controller 104.

Next, the file system controller 103b refers to the acquired entry and confirms whether or not the entry concerning the file designated by the application 103a exists (S805). If the entry exists, the procedure proceeds to S806. If the entry does not exist, the procedure completes the file search process for this information recording medium 106, and the procedure returns to S802, while continues the file search process for other information recording media 106.

If the entry of the file designated by the application exists in S805, the file system controller 103b creates open information 402C on the basis of the acquired entry (S806). In this embodiment, a file search process is carried out sequentially starting from the information recording medium 106 having the highest priority, and open information 402C is newly created when the corresponding file is initially discovered. In a normal file system management, a file search process is completed at the time point when the corresponding file is discovered, and the application 103a is notified that the open process has been completed. However, in this embodiment, the process is continued until the completion of the file search process for all of the information recording media 106 attached to the slots. At this time, if a file having the same name exists in another information recording medium 106, the slot number of the information recording medium 106 storing the file of the same file name is stored in the portion of the same file name flag of the previously created open information 402C.

In the example of FIG. 9, the file existing in the slot A and having the name, File1.TXT, is open. The same file name flag is formed of a field having the bit width of which the number is the same as the number of all slots existing in the information processing device 100, and bits which correspond to the slot numbers of the information recording media with files of the same name are turned on. In the example of FIG. 9, the bits that correspond to the slot A and the slot N are turned on, indicating that files having the name, FILE1.TXT, exist in the slot A and the slot N.

When the process of S806 has been completed, the file search process for the information recording medium 106 is completed, and the procedure returns to S802, while the file search process for other information recording media 106 is continued. If the file search process is completed for all of the slots in S802, the file system controller 103b gives the open result to the application 103a, completing the process (S807). If the open process is successful, the file system controller 103b returns a file handle for utilization for subsequent file accesses to the application 103a. In addition, if the same file name exists, the file system controller 103b returns the file handle and notifies the application 103a that the same file name exists.

As described above, in this embodiment, the file search process for all of the information recording media 106 is carried out in accordance with the priority order within the slot information 401C when the file is opened. In addition, the process continues even when this file is discovered, and confirms whether or not a file having the same name exists in another information recording medium 106. As a result of this, if a file having the same name exists, the file system controller 103b can uniquely determine a file for the open target, and always grasp the existence of a file having the same name.

Figure 10A:
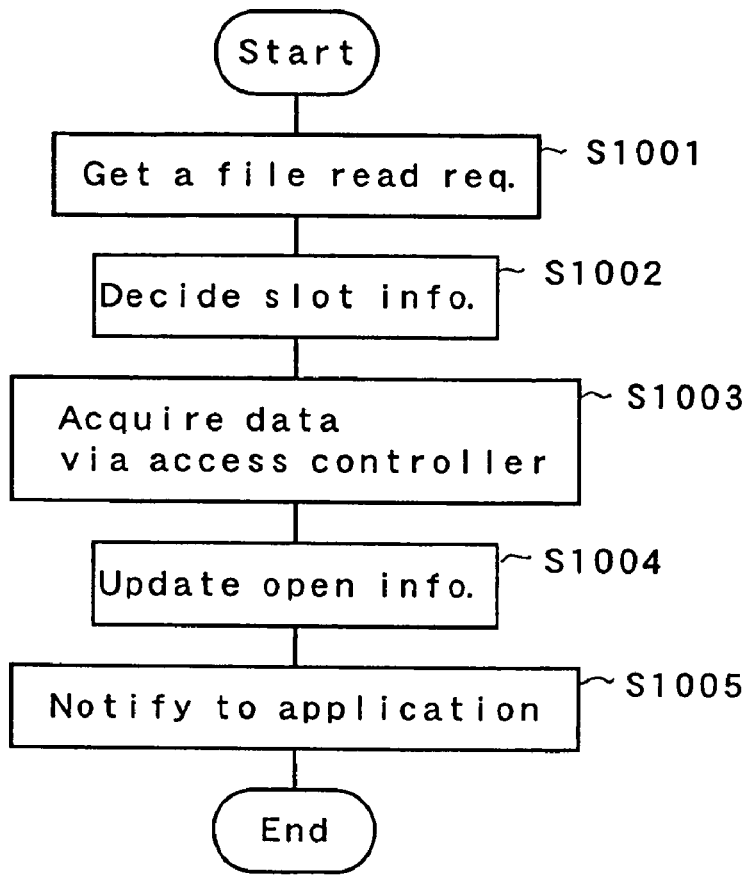
FIGS. 10A-10B show a flowchart and process for a file read process.
Figure 10B:
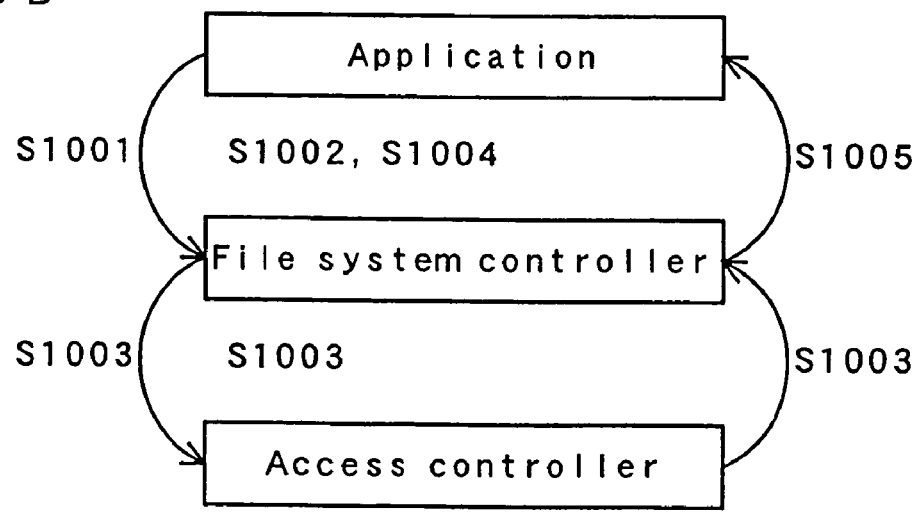

(3-2): A file read process as the file access process is described with reference to FIG. 10. FIG. 10(A) is a flowchart showing a procedure of file reading. FIG. 10(B) is a conceptual diagram showing the relationship between the application 103a, the file system controller 103b and the access controller 104.

In the file read process, first, a request for reading a file is issued from the application 103a to the file system controller 103b (S1001). In the request for reading a file, the application 103a designates the file handle acquired in file opening to the file system controller 103b. Upon reception of the request for reading a file, the file system controller 103b refers to the open information 402 on the basis of the designated file handle and determines the slot information to be utilized (S1002).

Next, the file system controller 103b designates the number of the slot determined in S1002 to the access controller 104, and reads in data from the attached information recording medium 106 (S1003). At this time, information such as the read-in starting position, which is necessary for read-in from the information recording medium 106, and the read-in size is calculated on the basis of the slot information 401, which corresponds to the determined slot, and the open information 402, and the information is given to the access controller 104.

Next, the file system controller 103b updates the open information if the open information needs to be changed, by means of the file read process (S1004). Finally, the file system controller 103b gives the data read in from the information recording medium 106 and the read result to the application 103a, completing the process (A1005).

Figure 11A:
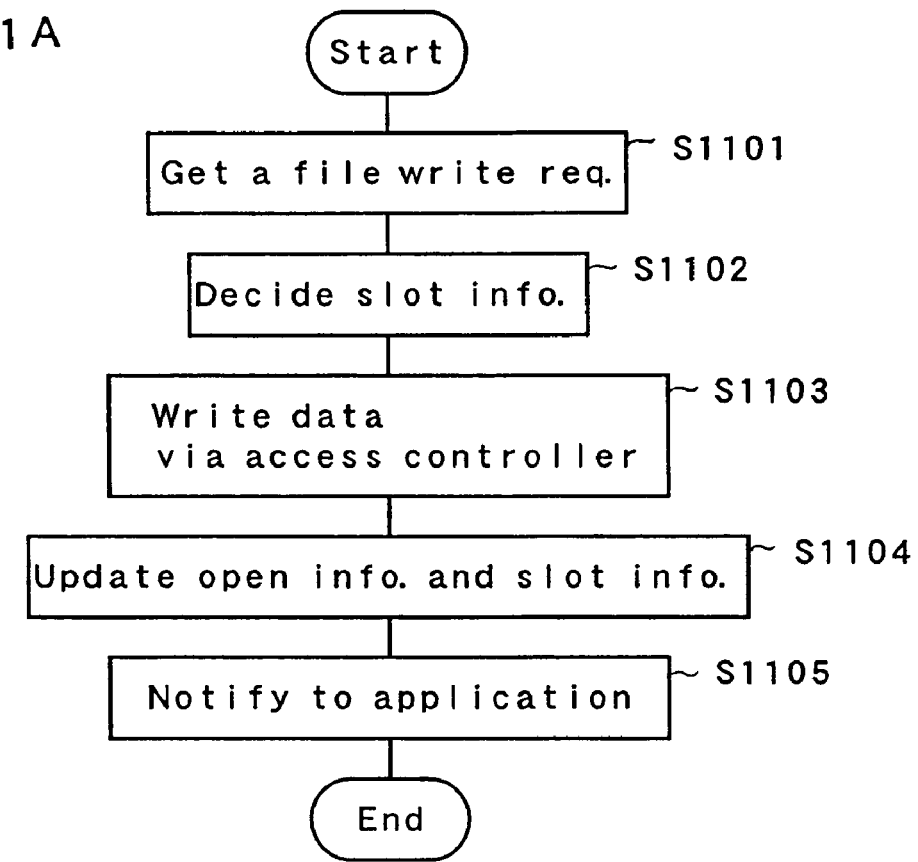
FIGS. 11A-11B show a flowchart and process for a file write process.
Figure 11B:
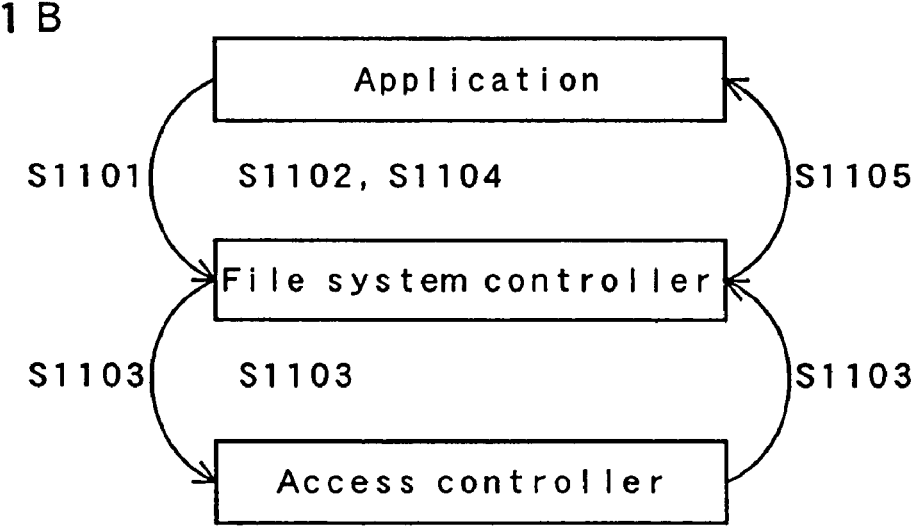

(3-3): A file write process as the file access process is described below. FIG. 11(A) is a flowchart showing the file write process. FIG. 11(B) is a conceptual diagram showing the relationship between the application 103a, the file system controller 103b and the access controller 104. The points which are different from the file read process are those where data is passed from the application 103a to the access controller 104, rather than those where data is passed from the access controller 104 to the application 103a, and where the slot information 401 is updated when FAT or the like included in the slot information 401 is updated in S1104. The other parts of the process are the same as the file read process, and the descriptions thereof are omitted.

Figure 12A:
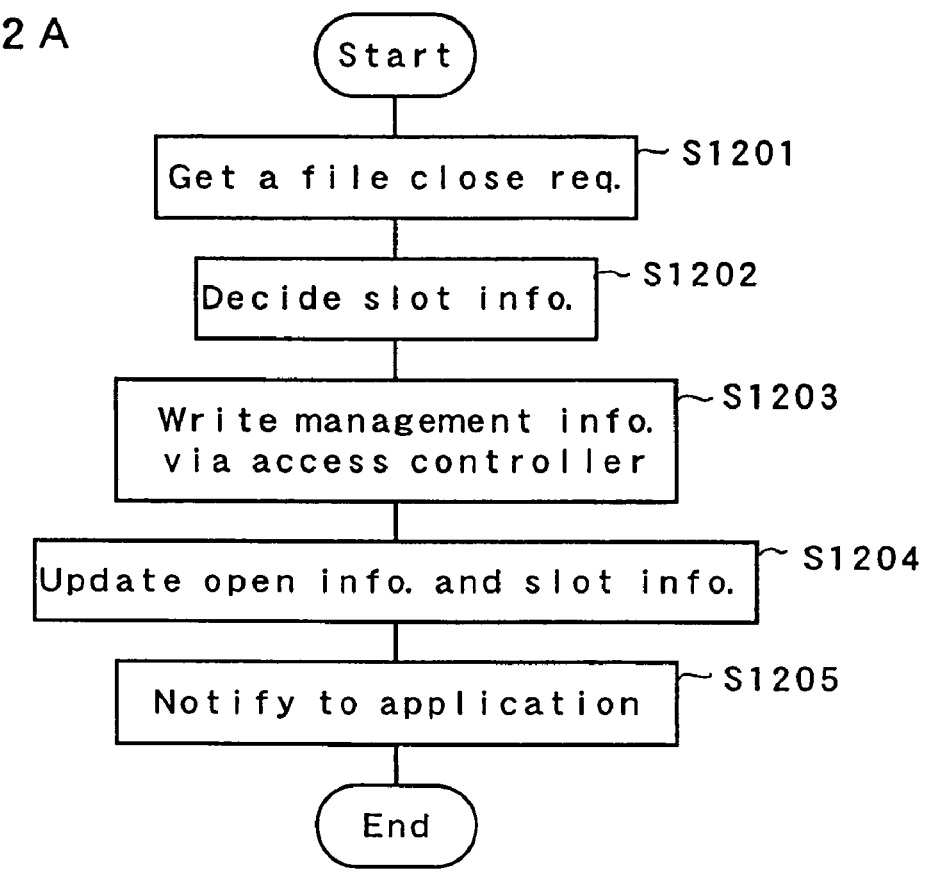
FIGS. 12A-12B show a flowchart and process for a file close process.
Figure 12B:
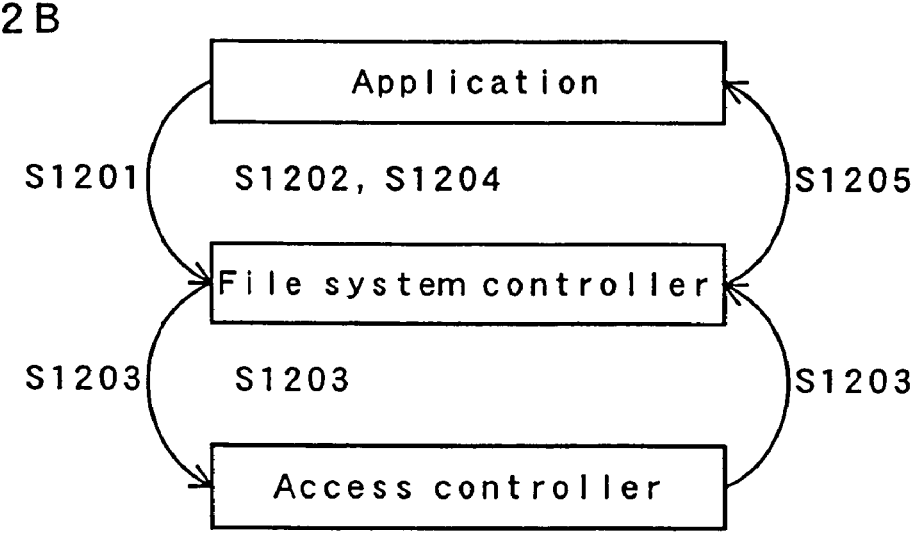

(3-4): A file close process as the file access process is described below. FIG. 12(A) is a flowchart showing a procedure, and FIG. 12(B) is a conceptual diagram showing the relationship between the application 103a, the file system controller 103b and the access controller 104. In the file close process, first, a file closing request is issued from the application 103a to the file system controller 103b (S1201). In the file closing request, the application 103a designates the file handle acquired in the file opening to the file system controller 103b. Upon the reception of the file closing request, the file system controller 103b refers to the open information 402 on the basis of the designated file handle and determines the slot information to be utilized (S1202).

Next, the file system controller 103b refers to the slot information 401 determined in S1202 and the open information 402, and writes in data which needs to be written into the information recording medium 106, concerning the management information of the file system (S1203). At this time, the file system controller 103b calculates information such as the write-in starting position required for write-in into the information recording medium 106, and the write-in size on the basis of the slot information 401, which corresponds to the determined slot, and the open information 402, and the information is given to the access controller 104.

Next, the file system controller 103b initializes the open information 402 of the file to be closed, and updates the slot information 401 if the slot information needs to be changed (S1204). Finally, the file system controller 103b gives the close result to the application 103a, completing the process (S1205).

Figure 13A:
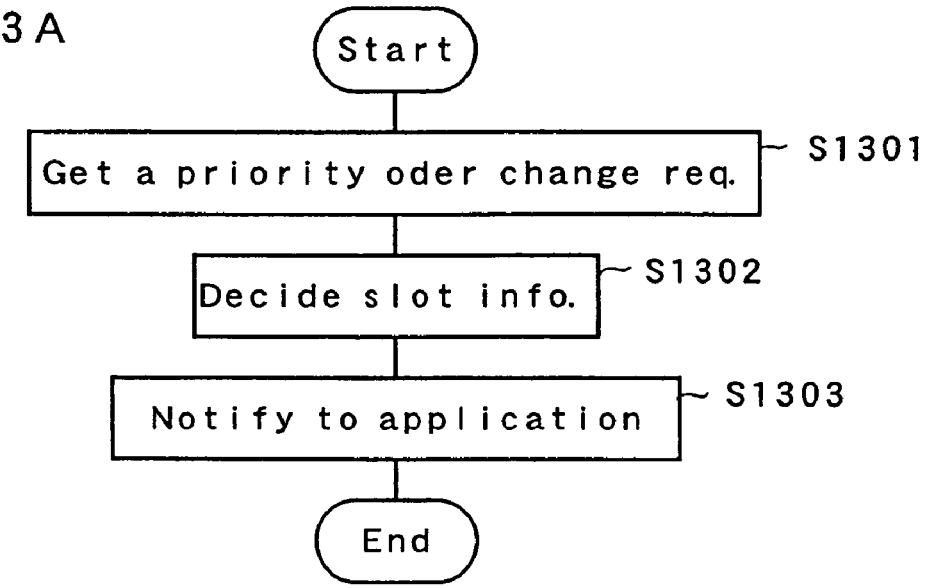
FIGS. 13A-13B show a flowchart and process for a priority order change process.
Figure 13B:
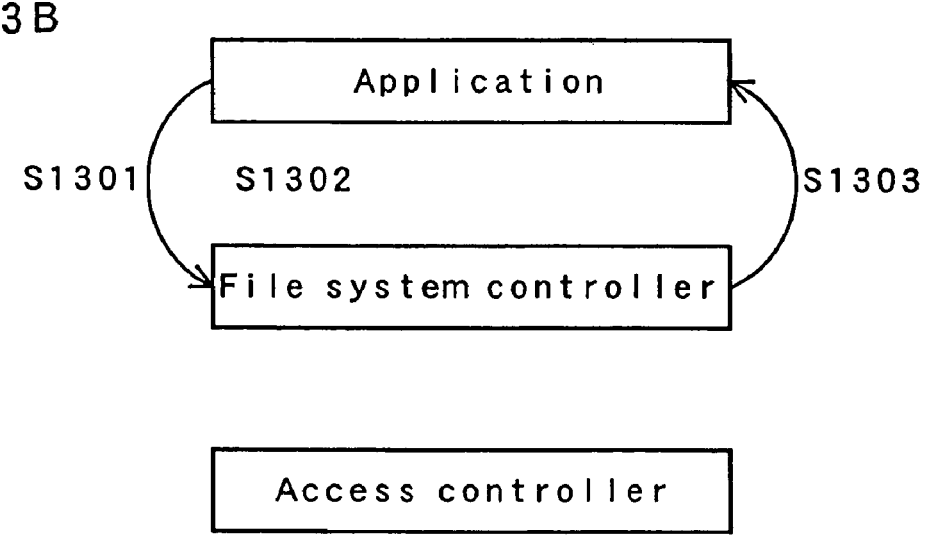

(4): Next, a priority order change process is described with reference to FIG. 13. FIG. 13(A) is a flowchart showing a procedure, and FIG. 13(B) is a conceptual diagram showing the relationship between the application 103a, the file system controller 103b and the access controller 104. In the priority order change process, first, a priority order changing request is issued from the application 103a to the file system controller 103b (S1301). In the priority order changing request, the application 103a designates information concerning the priority order after the change to the file system controller 103b. Upon reception of the priority order changing request, the file system controller 103b updates the priority order held within the slot information 401 (S1302). Finally, the file system controller 103b gives the result of the priority order change to the application 103a, completing the process (S1303).

The priority order change process is carried out in response to a request from the application 103a at an arbitrary time point, after turning on the information processing device 100, and is utilized when the application 103a primarily switches the information recording medium 106, which is accessed for files having the same name. When the application 103a opens a file having the name, File1.TXT, for example, a case is assumed where it has been notified that files having the same name exist as a returning value of the file open process. At this time, the application 103a sequentially carries out a process on all of the files having the same name, if necessary.

First, the application 103a acquires the slot numbers of all the information recording media 106 where files having the name, File1.TXT, exist, from the file system controller 103b. Here, as an example, three slot numbers A, B and C are assumed to have been acquired. Next, the priority order change process is carried out so as to set the slot number A as the top priority. In this state, the open, read, write and close processes are carried out on File1.TXT, and the file access process required by the application is carried out.

Next, the priority order change process is carried out so as to set the slot number B as the top priority, and then, the file access process is carried out on File1.TXT, in the same manner as in the previous process. The priority order change process and the file access process are carried out on the slot C in the same manner, so as to complete the process on the files having the name, File1.TXT, in all of the information recording media 106 attached to the information processing device 100. As a result of this, the file system controller 103b can carry out the process where the application 103a acquires all of the slot numbers in which files having an arbitrary file name are stored, and the process where the application 103a acquires the slot numbers in which files that are open at that point are stored.

As described above, in this embodiment, information concerning file systems constructed within the plurality of information recording media 106 is managed by the file system controller 103b in a unified manner. Therefore, it is not necessary for the application 103a to individually recognize the plurality of information recording media 106, and the application 103a can operate as if a single information recording medium 106 is attached. In addition, even when the order or the positions of the attachments of the plurality of information recording media 106 have been changed, it is not necessary for the application 103a to recognize the information recording media 106.

In addition, the slot numbers of the information recording media 106 in which files are stored and the same file name flags that indicate whether or not the same file name exists in another information recording medium 106 are retained as information concerning the files which are open. Thus, the priority order is set for the use of the respective slots, so that the application 103a selects for use an arbitrary file from among files having the same name, if necessary.

Here, the configuration of the file system control information 400 described in each of the above embodiments is merely an example, and other information concerning the file system control may be retained. In addition, though a case where the slots A to N exist in the information processing device 100 is described in this embodiment, the number of slots is arbitrary, as long as it is no less than 1. In addition, the initial value of the priority order that indicates the priority for use of the respective slots may be newly set at the initial value allocated to each slot in a one-to-one relationship for each time that the power is turned on. Instead, the value of the priority order at the time point when the information processing device 100 is previously turned off may be stored, so that this value is set as the initial value.

In addition, as for the priority order stored in the slot information 401, the priority order for read-in of the existing files and the priority order for newly preparing files may be set separately in the configuration. In addition, the method according to which the application 103a designates the priority order after the change in the priority order changing request may follow the format where pairs of slot numbers and new priority orders of which the number is the same as that of the slots in the information processing device 100 are prepared for the designation, or may follow another format.

In addition, in this embodiment, an example is described where, if files having the same name exist, the application is notified of this at the time of file opening. However, the existence of files having the same name may be notified in response to a request from the application at an arbitrary point in time, instead of the notify at the time of file opening. In addition, an example is described where flags are set in response to the slots of the information recording media 106 in which files having the same name are stored, as the same file name flags. However, flags that indicate only the existence of files having the same name may simply be set.

Figure 14:
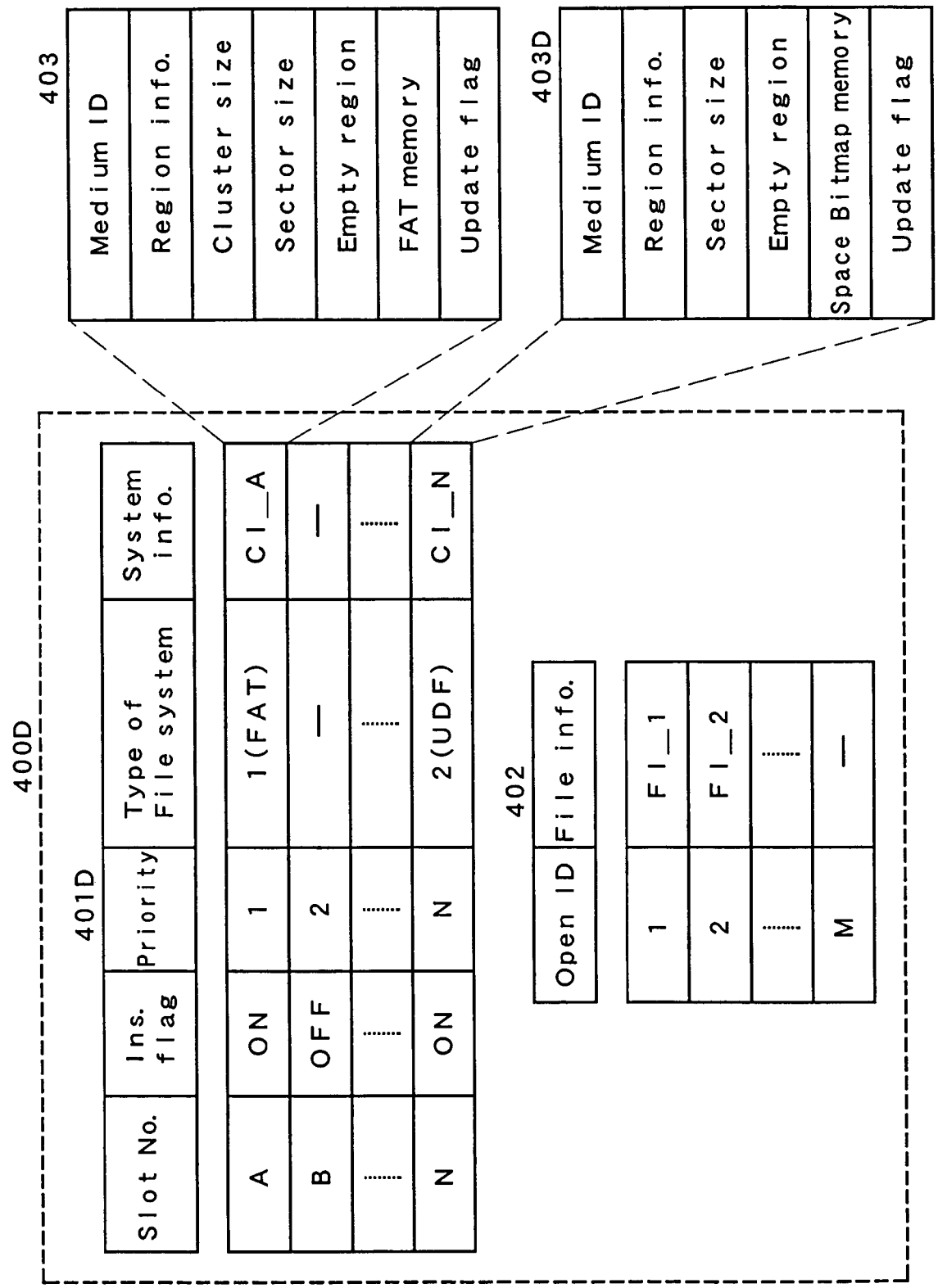
FIG. 14 is a flowchart showing another configuration of file system control information according to the embodiment of the present invention.

In addition, though in this embodiment, a case is described where all of the information recording media attached to the slots utilize a FAT file system, the respective information recording media may utilize different file systems. FIG. 14 shows a configuration of the file system control information 400D in this case. In the example of FIG. 14, a case is assumed where the information recording medium attached to the slot A utilizes a FAT file system, and the information recording medium attached to the slot N utilizes a UDF file system.

The points which are different from the case of FIG. 4 are those where the type of the file system is added to the slot information 401D, and where the configurations of system information of the slot A and of the slot N are different from each other. If the types of file systems are different, methods for storing file management information, such as file sizes and file names, are different; therefore, it is necessary for the file system controller to change the access procedure for files in each file system. Therefore, the type of file system is added to the slot information 401D as a flag for identifying the type of file system which is utilized by the information recording medium attached to each slot. In addition, information that depends on each file system is stored in the system information; different information is stored if the type of file system is different. Therefore, system information having different configurations is stored in the slot information 401 for each type of file system.

The FAT memory that exists within the system information 403 of a FAT file system, for example, is a memory for storing region management information of the FAT file system. In contrast to this, in a UDF file system, region management is carried out using information which is referred to as Space Bitmap; therefore, a Space Bitmap memory exists within the system information 403, instead of a FAT memory. This conversion from the FAT memory to the Space Bitmap memory is merely an example, and other modifications may be carried out. As described above, the file system control information 400D is modified, so that it is possible to apply the present invention even in the case where information recording media attached to the respective slots utilize different file systems.

INDUSTRIAL APPLICABILITY

A file management method according to the present invention allows data of a required file to be accessed in a single file system when a plurality of information recording media exist in the information processing device. Such a file management method functions well particularly when a plurality of files having the same name exist. The present invention can be applied to a portable recording and reproducing apparatus, an audio server, or a video server where a large number of music files or the like are stored. In addition, the present invention can be applied to a mobile server having a large number of slots, a PC having a variety of types of external memory units and the like.

The invention claimed is:

1. An information processing device in which a plurality of information recording media is simultaneously attached when said plurality of information recording media exists, wherein data stored in an information recording region is managed as a file by means of an individual file system, comprising:

a plurality of slots which are provided in the body of said information processing device to attach the respective information recording media;

a system memory which retains file system control information for recognizing individual file systems constructed in said plurality of information recording media and unifies and controls the individual file systems into a single virtual file system, wherein said file system control information includes:

(1) slot information including a priority order retained in said file system control information showing a priority for use of the plurality of information recording media and system information showing a file system in said information recording media, and (2) open information showing information on opened files as well as flags for files having the same name;

a file system controller which refers to said slot information and said open information, and which sets said flags and accesses a file in a logical information recording region of said information recording media based on the priority order when files having the same name exist in said plurality of information media; and an access controller which selectively accesses one of the plurality of slots and accesses an address in said information recording media designated by said file system controller, and acquires data of a file.

2. The information processing device according to claim 1, wherein said file system controller initializes said slot information and open information of file system control information in said system memory where a state is initially set for said application program in a manner that said information recording media are not attached and that all of the files are not open, when said information processing device is turned on.

3. The information processing device according to claim 1, wherein said file system controller sets the priority order of said slots in said slot information in advance for the respective slots when said information processing device is turned on.

4. The information processing device according to claim 1, wherein said file system controller creates slot information in reference to data recorded on a management information region of said information recording media and data in a part of a data region, wherein said file system controller constructs a part of said file system control information when said information recording medium is attached to any of said plurality of slots.

5. The information processing device according to claim 1, wherein when opening a specific file from said information recording medium, said file system controller refers to said slot information included in said file system control information, accesses all of the information recording media attached to the slots in an order based on said priority order included in said file system control information, confirms whether or not a file designated by an application exists, creates open information when a designated file is initially discovered, registers a flag that indicates whether or not a file having the same name exists with file information when the file having the same name exists in another information recording medium, and creates a file handle which is related to said open information.

6. The information processing device according to claim 1, wherein when reading out data of a specific file from said information recording medium, said file system controller refers to said open information by using a file handle acquired at the time of file opening from said application, determines which slot information is to be utilized, and gives the obtained slot number to said access controller in order to read out file data required for said application from a specific information recording medium.

7. The information processing device according to claim 1, wherein when recording file data on said information recording medium, said file system controller refers to said open information by using a file handle acquired at the time of file opening from said application, determines which slot information is to be utilized, and gives the obtained slot number to said access controller in order to record file data produced by said application on a specific information recording medium, and updates the slot information of the file system control information retained by said system memory.

8. The information processing device according to claim 1, wherein
when closing a specific file from said information recording medium, said file system controller refers to said open information by using a file handle acquired at the time of file opening from said application, determines a slot number that is being utilized, and gives the obtained slot number to said access controller in order to record management information in a management information region of said specific information recording medium, and initializes the open information of the file.

9. A file management method for managing data stored in respective information recording regions within a plurality of information recording media by means of a file system controller and an access controller of an information processing device, wherein said method comprises the steps of:
setting a utilization priority order for a plurality of slots to which said information recording media are attached;
creating slot information with system information in reference to data in a management information region recorded in said information recording medium and data in a part of a data region when said information recording media are attached to any of said plurality of slots, said file system controller producing a part of file system control information;
opening a specific file from an information recording medium, referring to said slot information included in said file system control information and said priority order included in said file system control information, accessing all of the information recording media attached to the slots, confirming whether or not a file that is designated by an application exists, creating open information when a designated file exists, registering a flag that indicates whether or not a file having the same name exists with said open information, and thereby, producing the rest of said file system control information, and thus constructing a unified file system where individual systems in said plurality of information recording media are unified through said file system controller;
reading out data of a specific file from said information recording medium, referring to open information of said file system control information by using a file handle acquired at the time of file opening from said application, determining which slot information is to be utilized, and giving the obtained slot number to said access controller, and thereby reading out file data required for said application from a specific information recording medium through said file system controller; and
recording file data on said information recording medium, referring to said file system control information by using a file handle acquired at the time of file opening from said application determining which slot information is to be utilized, and giving the obtained slot number to said access controller, and thereby recording file data produced by said application in a specific information recording medium, and updating slot information of said file system control information through said file system controller.

10. The file management method according to claim 9, wherein
said plurality of information recording media are all managed by the same type of file system.

11. The file management method according to claim 9, wherein
said plurality of information recording media are managed by different types of file systems.

12. The file management method according to claim 9, wherein
said file system controller uniquely specifies a file to be accessed on the basis of said priority order from among files having the same name that exist in said plurality of information recording media.

13. The file management method according to claim 9, wherein
said file system controller confirms the existence of files having the same name in said plurality of information recording media, and gives the result to said application program.

14. The file management method according to claim 9, wherein
said file system controller confirms the existence of files having the same name in said plurality of information recording media, and gives the result to said application program in response to a request from said application program at an arbitrary time point.

* * * * *